US010861270B2

(12) United States Patent
Rines et al.

(10) Patent No.: US 10,861,270 B2
(45) Date of Patent: Dec. 8, 2020

(54) PRESENCE-BASED AUTOMATIC GATE OPERATION FOR MARINE BARRIERS AND GATE SYSTEMS

(71) Applicant: Halo Maritime Defense Systems, Inc., Newton, NH (US)

(72) Inventors: Eric H. Rines, Manchester, NH (US); Judson DeCew, Rochester, NH (US); Eric G. Johnson, Danvers, MA (US)

(73) Assignee: Halo Maritime Defense Systems, Inc., Newton, NH (US)

( * ) Notice: Subject to any disclaimer, the term of this patent is extended or adjusted under 35 U.S.C. 154(b) by 97 days.

(21) Appl. No.: 16/263,072

(22) Filed: Jan. 31, 2019

(65) Prior Publication Data

US 2019/0236868 A1 Aug. 1, 2019

Related U.S. Application Data

(60) Provisional application No. 62/624,946, filed on Feb. 1, 2018.

(51) Int. Cl.
*G07C 9/28* (2020.01)
*E02B 7/38* (2006.01)
*E02B 7/50* (2006.01)
*F41H 11/05* (2006.01)
*H04L 29/06* (2006.01)
(Continued)

(52) U.S. Cl.
CPC ............... *G07C 9/28* (2020.01); *E02B 7/38* (2013.01); *E02B 7/50* (2013.01); *G07C 9/37* (2020.01); *H04L 63/0853* (2013.01); *F41H 11/05* (2013.01); *H04L 63/107* (2013.01); *H04W 12/00407* (2019.01)

(58) Field of Classification Search
None
See application file for complete search history.

(56) References Cited

U.S. PATENT DOCUMENTS 6,490,443 B1 12/2002 Freeny
6,970,850 B1 11/2005 Freeny
7,110,744 B2 9/2006 Freeny
(Continued)

FOREIGN PATENT DOCUMENTS

JP 5363705 B2 12/2013
JP 2014-163067 A 9/2014

OTHER PUBLICATIONS

PCT International Search Report dated Apr. 10, 2019 for International Application No. PCT/US2019/015954.

*Primary Examiner* — Carlos Garcia
(74) *Attorney, Agent, or Firm* — Studebaker & Brackett PC

(57) ABSTRACT

A system and method are provided for presence based automatic operation of a marine barrier gate for protecting a secured area. Embodiments include a system having RFID sensors outside and inside the secured area, and proximal the gate. A controller verifies that a user is authorized to enter the secured area when one or more of the RFID sensors communicate with a user identification unit carried by the user; opens the gate or causes the gate to remain open when the user's authorization to enter the secured area is verified; tracks a location of the user identification unit using the RFID sensors while the gate is open and the user is transiting the gate; and closes the gate when the RFID sensors are no longer in communication with the user identification unit.

21 Claims, 17 Drawing Sheets

(51) Int. Cl.
  *G07C 9/37* (2020.01)
  *H04W 12/00* (2009.01)

(56) References Cited

U.S. PATENT DOCUMENTS

| | | |
|---|---|---|
| 7,453,358 B2 | 11/2008 | Webster |
| 7,617,974 B2 | 11/2009 | Vandyck et al. |
| 8,020,836 B2 | 9/2011 | Bishop |
| 8,462,994 B2 | 6/2013 | Ortiz et al. |
| 8,593,250 B2 | 11/2013 | Schorn |
| 8,739,725 B2 | 6/2014 | Bishop |
| 8,920,075 B2 | 12/2014 | Bishop |
| 8,935,184 B2 | 1/2015 | Freeny |
| 9,121,153 B2 | 9/2015 | Bishop |
| 9,363,264 B2 | 6/2016 | Novack et al. |
| 9,679,425 B2 | 6/2017 | Elbling et al. |
| 9,728,072 B2 | 8/2017 | Reibel |
| 10,280,579 B2 * | 5/2019 | Rines .................. E02B 7/50 |
| 2003/0169166 A1 | 9/2003 | Parsadayan |
| 2004/0212500 A1 | 10/2004 | Stilp |
| 2008/0249883 A1 | 10/2008 | Daily |
| 2011/0227016 A1 | 9/2011 | Iffergan |
| 2015/0015365 A1 | 1/2015 | Ortiz et al. |
| 2015/0213660 A1 | 7/2015 | Bergdale et al. |
| 2015/0227923 A1 | 8/2015 | Kutsch et al. |
| 2016/0289907 A1 | 10/2016 | DeCew et al. |
| 2017/0109942 A1 | 4/2017 | Zivkovic et al. |

* cited by examiner

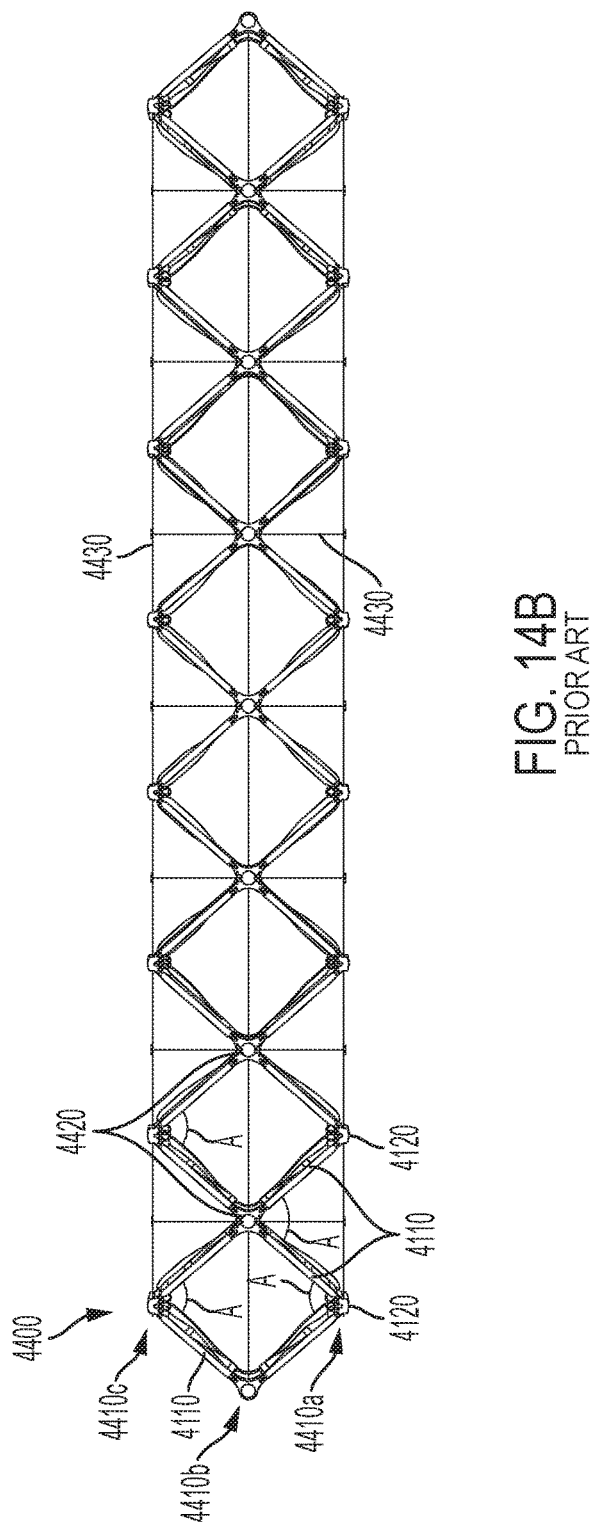

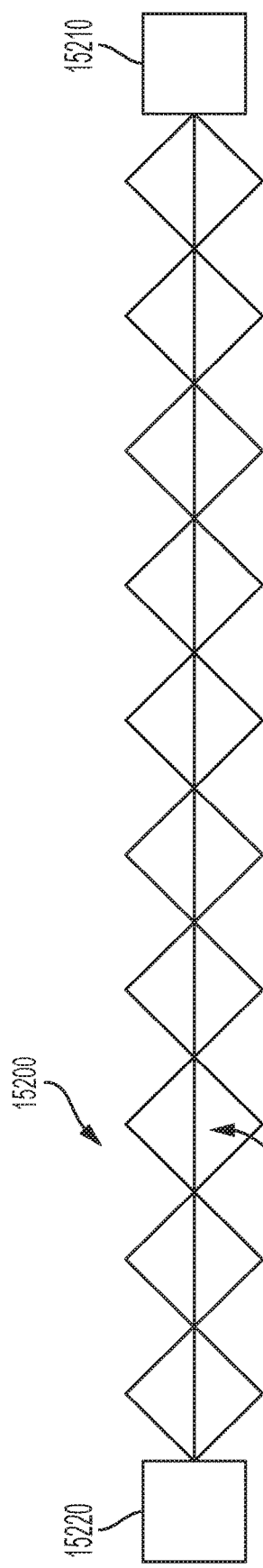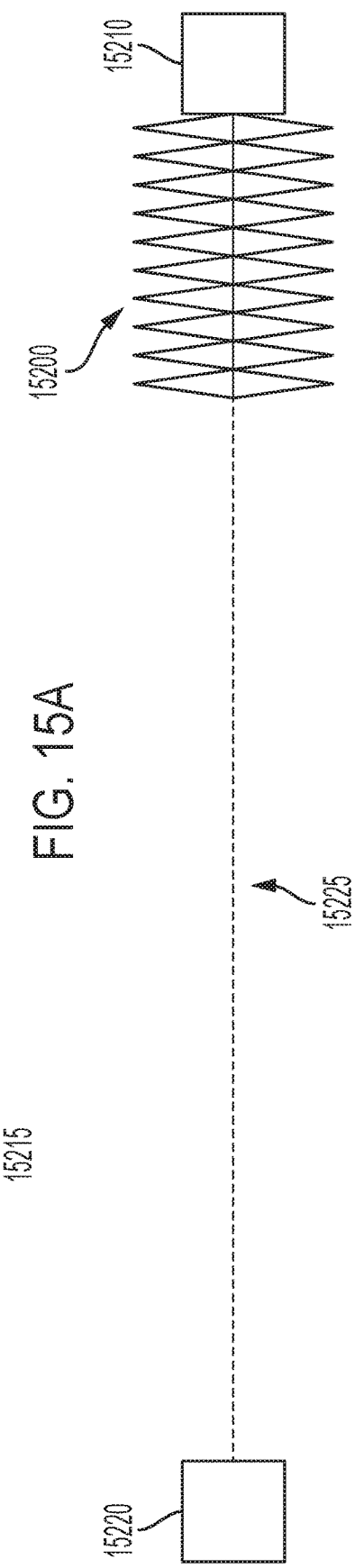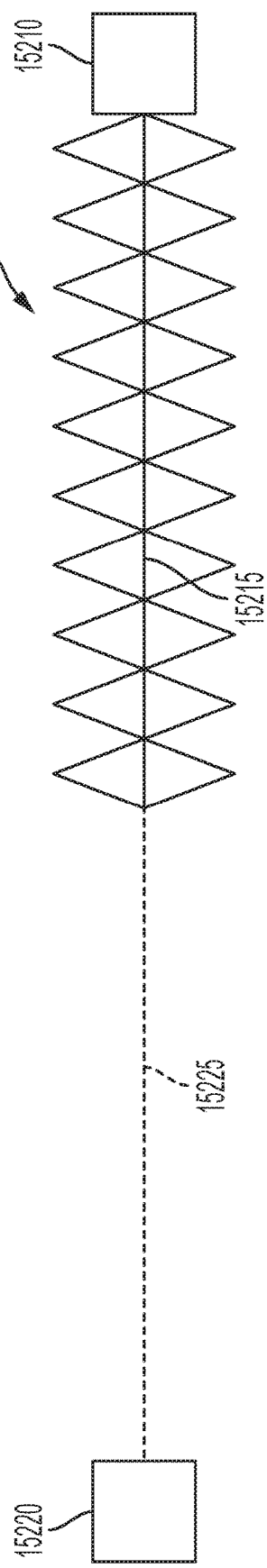

PRESENCE-BASED AUTOMATIC GATE OPERATION FOR MARINE BARRIERS AND GATE SYSTEMS

RELATED APPLICATIONS

The present application claims priority from U.S. Provisional Application No. 62/624,946, filed Feb. 1, 2018, entitled "Automatic Gate Operation for Marine Barriers and Gate Systems," which is hereby incorporated by reference in its entirety.

FIELD

The present subject matter relates to marine barriers and movable gates. The present disclosure has particular applicability to automatic gate systems, to allow for safe transit of waterways secured by marine barriers and gates.

BACKGROUND

The disclosed embodiments herein improve upon conventional marine gate opening and closing operations. These conventional operations are either performed manually with a "man in the loop," or with push button controls (i.e., a single individual, user, or computer that controls when the gate opens and closes).

In conventional marine barriers that require a "man in the loop" to open and close the system, the basic open/close steps first require personnel to board a vessel and navigate to the gate entrance. Then, personnel disconnect the gate latching system (or equivalent) and tow the disconnected portion of the barrier out of the way. The tow vessel then communicates with the vessel wishing to pass through the gate and allows them to pass. During this time, the tow vessel remains on station. Once the navigating vessel has passed through the gate, the tow vessel tows the gate back to its closed position, secures the gate's latch (or equivalent locking system), and berths the vessel until the next open/close operation. This effort is not economically feasible for the majority of marinas, ports and other site restricted areas around the world due to the high cost of labor and vessels. Militaries reluctantly absorb this cost due to lack of options.

In other conventional "command and control" systems typically used by militaries, all requests to open/close a gate are passed through an entity such as port operations, which reviews the request, coordinates with other vessels and traffic, and initiates the opening/closing.

Having a "man in the loop" support opening and closing a gate in a marina/resort is not economically feasible due to the high number of vessels, canoes, kayaks, paddle boats, and small craft that enter and leave a marina or resort. This would result in continuous operation of the gate, without any means for the marina/resort to absorb this cost.

An alternative to the foregoing scenario is to not have a barrier or gate system at all. This has obvious downsides, such as needing 24-hour security vessels if the area is sensitive (military bases or applications). Absence of a barrier also causes a substantial increase in terms of nuisance traffic (unauthorized or unwanted water craft, jet skis, small craft, etc.) for harbors, marinas, resorts and high net worth residential communities. These nuisance vessels cause safety concerns and economic harm to resorts and marinas due to client complaints, damage from accidental impact events, and associated insurance claims.

There exists a need for a cost-efficient marine barrier/gate control and security system that does not require personnel to operate it or attend to it at all times.

SUMMARY OF THE DISCLOSURE

The present disclosure provides a marine security barrier system and method that addresses the aforementioned needs. The use of a presence based communication system, such as the disclosed system using radio frequency identification (RFID), which opens/closes the gate as users approach, solves the above mentioned issues. The "man in the loop" is removed, allowing any number of users to enter and exit the gate as they approach. Information on the user allows the facility to charge for the service, thus compensating for their investment. The barrier allows all authorized personnel freedom to enter/exit the facility while eliminating nuisance traffic and other security concerns (e.g., terrorists). The gate can remain open or closed for as long as required, thereby reducing costs of on-water personnel and vessel time, and operate any time of day/week/holiday, reducing overtime pay. Also, the gate can operate in any weather, improving safety and reducing accidents involving personnel.

Presence Based Versus Single "Command and Control" Type Automatic Gates

A presence based system such as the RFID type system described herein also improves upon the conventional single "command and control" system typically used by militaries. In the command and control operation, all requests to open or close an automatic gate are passed through a single entity (for example, port operations). The entity reviews the request, coordinates with other vessels and traffic, and initiates the opening/closing. This operation works well with marinas and bases that require a high level of security and access control. For marinas, resorts and other gated communities, this type of operation is expensive and inefficient—especially in places with a high level of traffic.

The disclosed presence based system and method improves upon the command and control system by reducing costs (eliminating the person required to operate the gate) and increases the system efficiency by having the ability to stop or start mid-cycle due to additional personnel present or change of direction by personnel. In addition, the disclosed presence based RFID system and method reduces the volume of calls/communication requests to the controlling entity to request gate operation.

Embodiments include a system for controlling a marine gate, the marine gate extending from a first attachment point to a second attachment point remote from the first attachment point when closed, and extending from the first attachment point to a point between the first and second attachment points when opened, wherein the gate is for protecting a secured area. The system comprises a first RFID sensor disposed outside the secured area, for communicating with a user identification unit; a second RFID sensor disposed proximal the gate or one of the first and second attachment points, for communicating with the user identification unit; a third RFID sensor disposed inside the secured area, for communicating with the user identification unit; and a controller in communication with the RFID sensors. The controller has one or more processors adapted to sequentially perform the following steps: verify that the user is authorized to enter the secured area when one or more of the RFID sensors communicate with the user identification unit; cause the gate to open or to remain open when the user's authorization to enter the secured area is verified; track a location of the user identification unit using the RFID sensors while the gate is open and the user is transiting the gate; and cause the gate to close when the RFID sensors are no longer in communication with the user identification unit.

Embodiments also include a method comprising providing a marine gate extending from a first attachment point to a second attachment point remote from the first attachment point when closed, and extending from the first attachment point to a point between the first and second attachment points when opened, wherein the gate is for protecting a secured area; providing a first RFID sensor disposed outside the secured area, for communicating with a user identification unit; providing a second RFID sensor disposed proximal the gate or one of the first and second attachment points, for communicating with the user identification unit; and providing a third RFID sensor disposed inside the secured area, for communicating with the user identification unit. The method further comprises verifying that the user is authorized to enter the secured area when one or more of the RFID sensors communicate with the user identification unit; opening the gate or causing the gate to remain open when the user's authorization to enter the secured area is verified; tracking a location of the user identification unit using the RFID sensors while the gate is open and the user is transiting the gate; and closing the gate when the RFID sensors are no longer in communication with the user identification unit.

Objects and advantages of embodiments of the disclosed subject matter will become apparent from the following description when considered in conjunction with the accompanying drawings. Additionally the different configurations discussed in the sections below may be performed in a different order or simultaneously with each other.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIGS. 14a and 14b are a perspective view and a top view, respectively, of a marine barrier that collapses along its length that is usable with the present disclosure.

FIGS. 15a-c are top views of a marine barrier gate usable with the present disclosure that collapses along its length, in its fully closed, fully opened, and partially opened position, respectively.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Figure 16A:
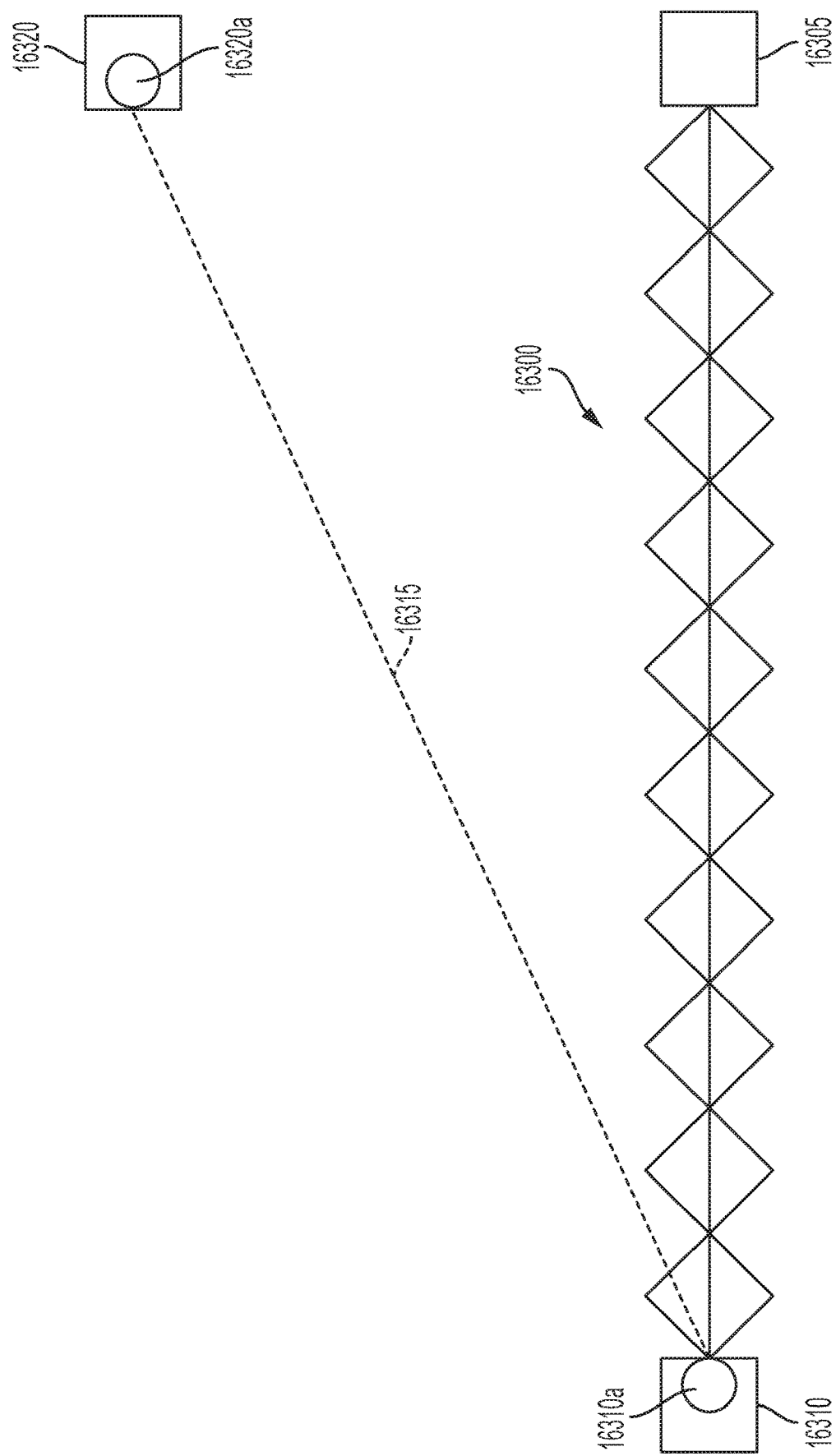
FIGS. 16a-b are top views of a marine barrier gate usable with the present disclosure that is swung open and closed, in its closed position and opened position, respectively.
Figure 16B:
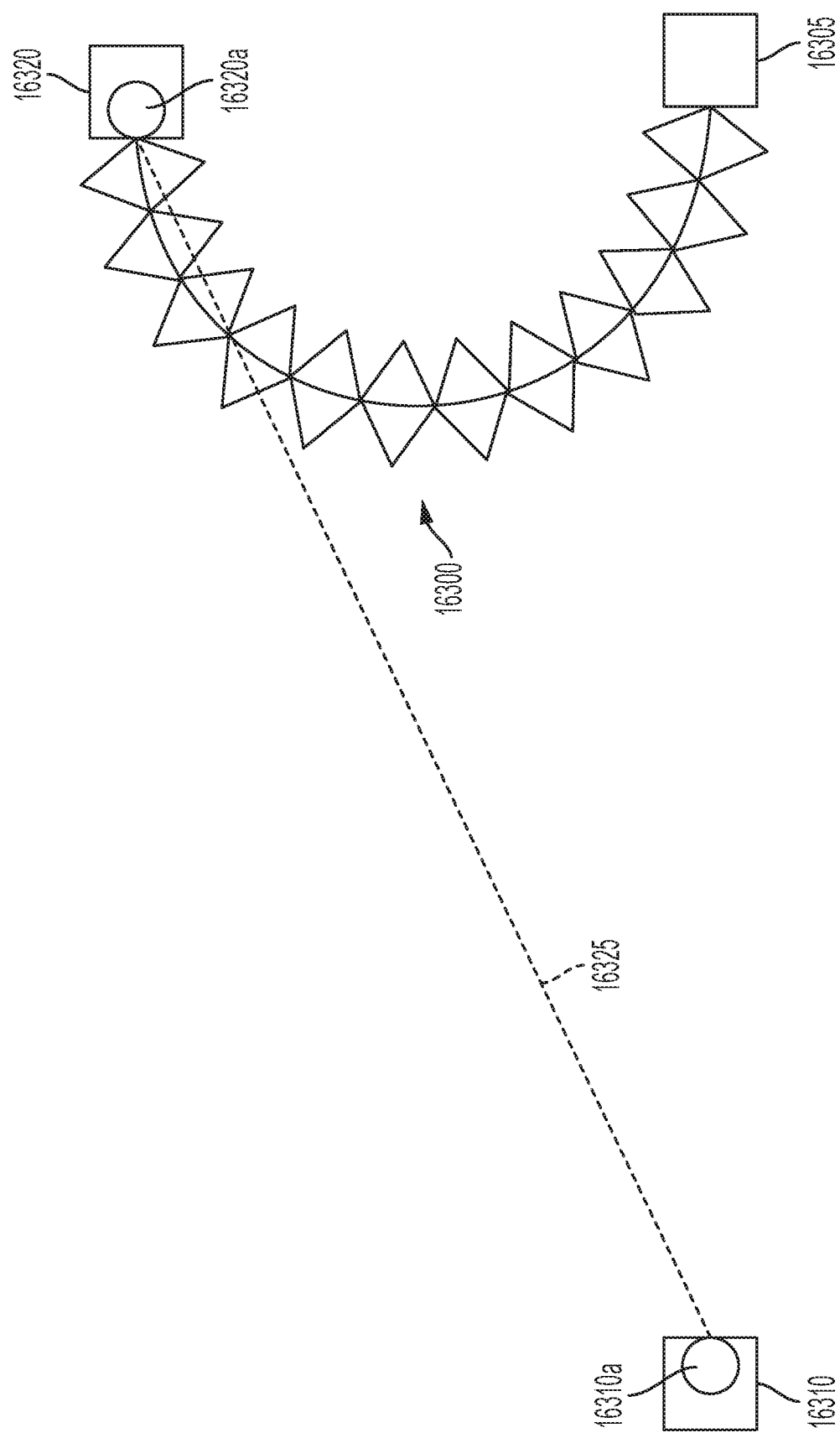

General Description of Marine Gates Usable with the Disclosed Systems and Methods The disclosed systems and methods are usable with a marine gate that is a floating structure to block entry to a port or controlled area, as illustrated in FIGS. 14a-16b. The disclosed systems, structures and techniques are usable with gates, such as the type shown in FIGS. 14a-14b and FIGS. 15a-15c, which are flexible and can collapse along their length. In certain other embodiments, the gate is rigid, semi-rigid or segmented and must be swung out of the way to provide vessel access, as shown in FIGS. 16a-b. The gate in FIGS. 16a-b can also be similar to the gate of FIGS. 14a-14b or FIGS. 15a-c.

Figure 14A:
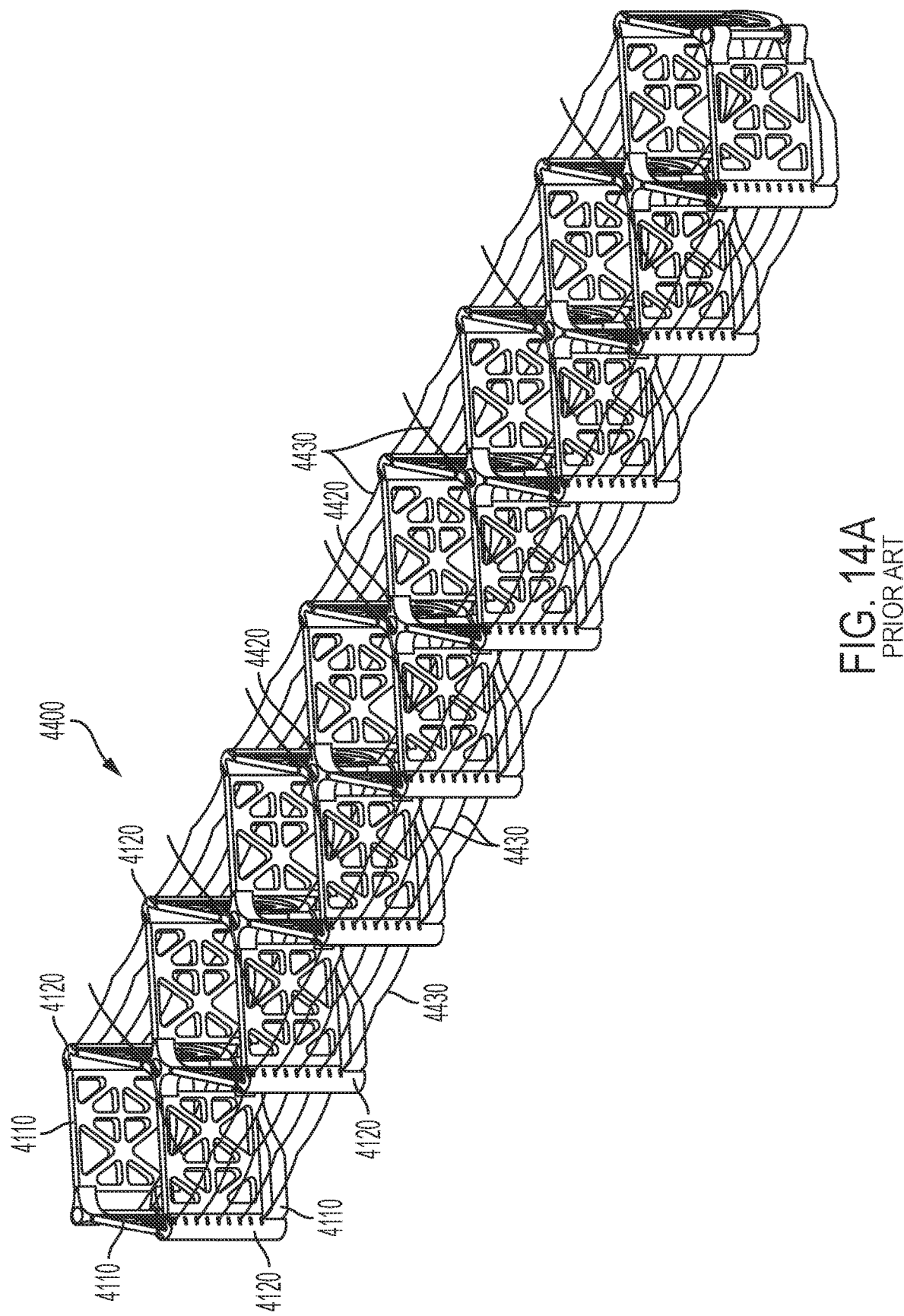

An exemplary marine barrier usable with the present disclosure is described in U.S. Pat. No. 8,920,075, which is hereby incorporated by reference in its entirety, and shown in FIGS. 14a-b. Referring now to FIGS. 14a-14b, a marine barrier 4400 of the '075 patent includes two continuous pleated rows of first and second respective pluralities of buoyant panels 4110, to form a diamond-shaped barrier. A plurality of outboard hinges 4120 and a plurality of inboard hinges 4420 elastically connect opposing sides of adjacent panels 4110 to form the included angle "A" therebetween, to form two continuous pleated rows such that the hinges 4120, 4420 are arranged in first, second, and third substantially parallel rows 4410a-c. Impact cables 4430 are provided to stop a vessel (not shown) that impacts the barrier 4400 by transmitting the forces of the impact to the panels 4110, the hinges 4120, 4420, and finally to the water.

Referring now to FIGS. 15a-b, an exemplary variable-length flexible barrier gate 15200 usable with the disclosed systems will be described. Gate 15200 can collapse along its length, and includes an opening winch 15210 connected to gate 15200 via an opening line 15215, and a closing winch 15220 connected to gate 15200 via a closing line 15225. When gate 15200 is opening, the opening winch 15210 draws in the opening line 15215, while the closing winch 15220 pays out the closing line 15225. After the gate 15200 is moved to the open position as shown in FIG. 15b, closing winch 15220 continue to pay out closing line 15225 until it rests on the seafloor, to allow vessels to pass through. The process is reversed to close the gate 15200.

In certain embodiments, the gate 15200 has open, partially open, and closed positions. The partially open position is shown in FIG. 15c. In such embodiments gate 15200 traverses along its length between a closed position (FIG. 15a), a partially open position (FIG. 15c), and a fully open position (FIG. 15b). After the gate 15200 is moved to the desired partially or fully open position shown in FIG. 15b or FIG. 15c, closing winch 15220 continues to pay out closing line 15225 until it rests on the seafloor, to allow vessels to pass through.

In further exemplary embodiments shown in FIGS. 16a-b, a variable-length gate is swung into its open, partially open, and closed positions. Gate 16300 is semi-rigid, and when closed extends between a first end connection 16305 and a second end connection 16310, as shown in FIG. 16a. When it is fully open, gate 16300 extends between first end connection 16305 and a secondary end connection 16320, as shown in FIG. 16b. An opening winch 16320a is connected to gate 16300 via an opening line 16315, and a closing winch 16310a is connected to gate 16300 via a closing line 16325. When gate 16300 is opening, the opening winch 16320a draws in the opening line 16315, while the closing winch 16310a pays out the closing line 16325. After the gate 16300 is moved to the fully open position as shown in FIG. 16b (or to a partially open position), closing winch 16310a continues to pay out closing line 16325 until it rests on the seafloor, to allow vessels to pass through. The process is reversed to close the gate 16300.

The disclosed gate system's actuator can be a conventional winch, which is connected to the barrier via a closing or opening line (e.g., a cable or rope). In certain embodiments, each winch is driven by a hydraulic motor, or through a transmission mechanism attached to a hydraulic motor. Alternatively, the winch(es) are driven by an electric motor, or through a transmission mechanism attached to an electric motor. The transmission mechanism may be a gearbox, chain-drive, belt-drive, or combination of any or all of these. Examples of commercially available winches usable with the disclosed gate systems include a hydraulic winch such as the Pullmaster H30 available from TWG of Tulsa, Okla., and an electric winch such as the Model HBP power winch available from Them Inc. of Winona, Minn.

Control Systems Usable to Implement the Disclosed Systems and Methods

Information related to various controllers will now be provided with reference to FIGS. 1-10, providing specific examples of conventional hardware and software usable to implement the disclosed gate controls. More specifically, FIGS. 1-10 show how certain equipment, signals, sensors, etc. can be employed to operate or provide information needed to implement the disclosed improved automatic functions of marine gates (such as those shown in FIGS. 14a-16b).

Control System with Dedicated Controller

Figure 1:
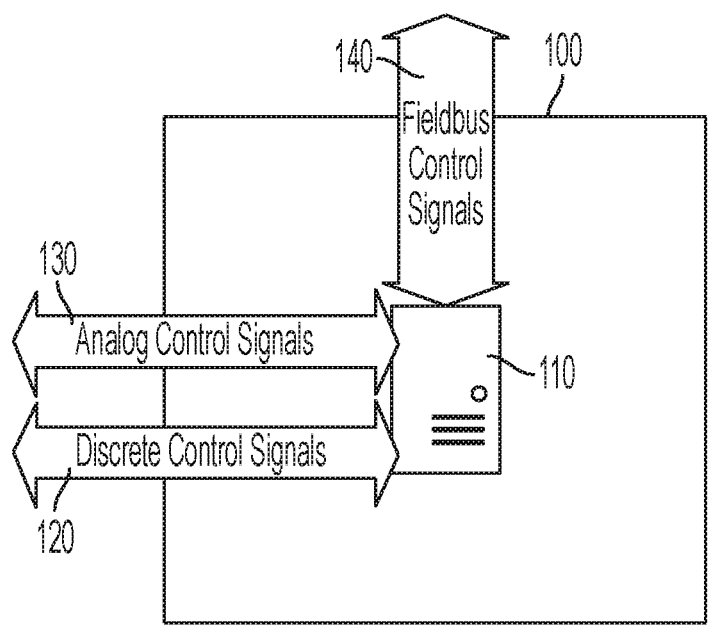
FIG. 1 schematically illustrates a conventional control system having a dedicated controller useable to implement the disclosed automatic gates.

FIG. 1 shows an example of a conventional system with a dedicated controller 100 useable with the automatic gates disclosed herein and in the '754 application. In this embodiment, the machine controller 100 comprises a dedicated process automation controller (PAC) 110 with dedicated control hardware, such as one of the Allen-Bradley CompactLogix® line of controllers (for example, Allen-Bradley Catalog No. 1769-L18ER-BB1B). The controller 100 can communicate with other equipment in the system using both discrete and analog signals 120, 130, as well as an Ethernet-based field-bus 140, such as ODVA® Ethernet/IP™ or EtherCAT® Technology Group, EtherCAT®.

Control System with Shared Controller

Figure 2:
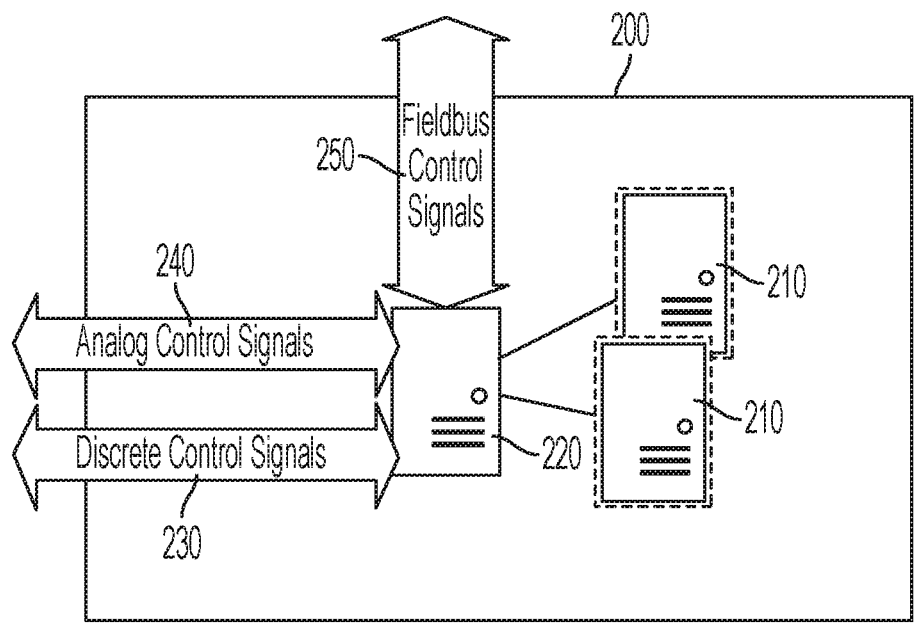
FIG. 2 schematically illustrates another conventional control system having a shared controller useable to implement the disclosed automatic gates.

FIG. 2 shows another example of conventional hardware useable to implement the control of gates disclosed herein. In this embodiment, the machine controller 200 comprises a shared personal computer (PC) 220; e.g., PC-based commodity hardware such as Beckhoffs CX series equipment (for example, Model CX9020). PC 220 can communicate with other equipment in the system using both discrete and analog signals 230, 240, as well as an Ethernet-based field bus 250. PC 220 can also communicate with one or more PACs 210 that control systems other than the gate opening/closing system, such as a security system, etc. The use of a PC allows expanded signal gathering, processing, and end use compared to the system shown in FIG. 1.

Control System with Dual Controller

Figure 3:
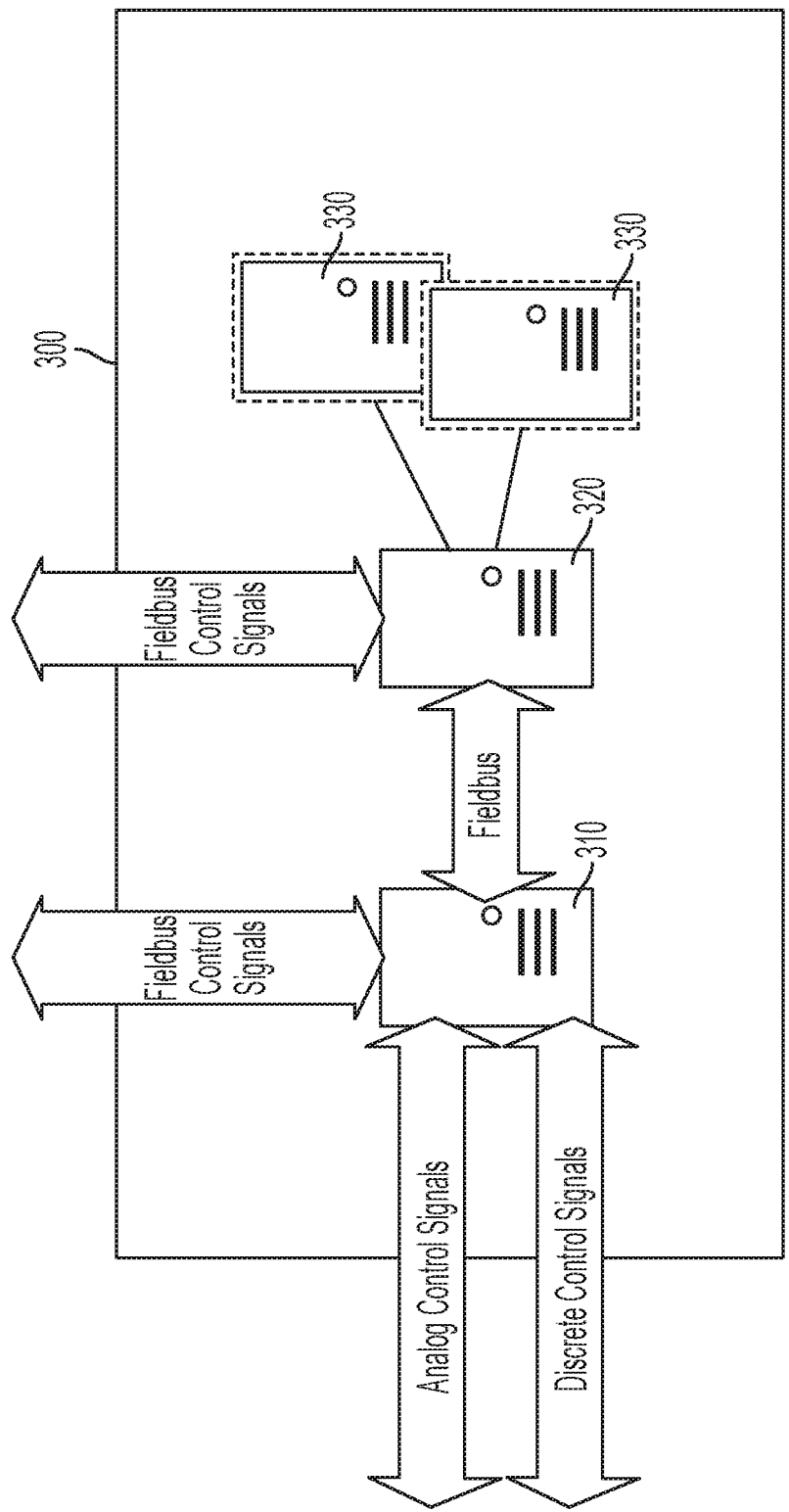
FIG. 3 schematically illustrates another conventional control system having dual controllers useable to implement the disclosed automatic gates.

FIG. 3 illustrates another example of conventional hardware and software that can be used to implement a gate control disclosed herein, showing that the input/output signals can be received and processed by a variety of methods. In this embodiment, the machine controller 300 comprises either a PC-based PAC or a dedicated first PAC 310, and includes a separate PC-based second PAC 320 for computing and logging operator inputs and outputs from local, remote, or cloud-based signals. This provides a layer of security via physical and network separation of the machine controller 300 and the operator controller. PC 320 can also communicate with one or more PACs 330 that control systems other than the gate opening/closing system, such as a security system, etc.

Control Locations—Local Control

Figure 4:
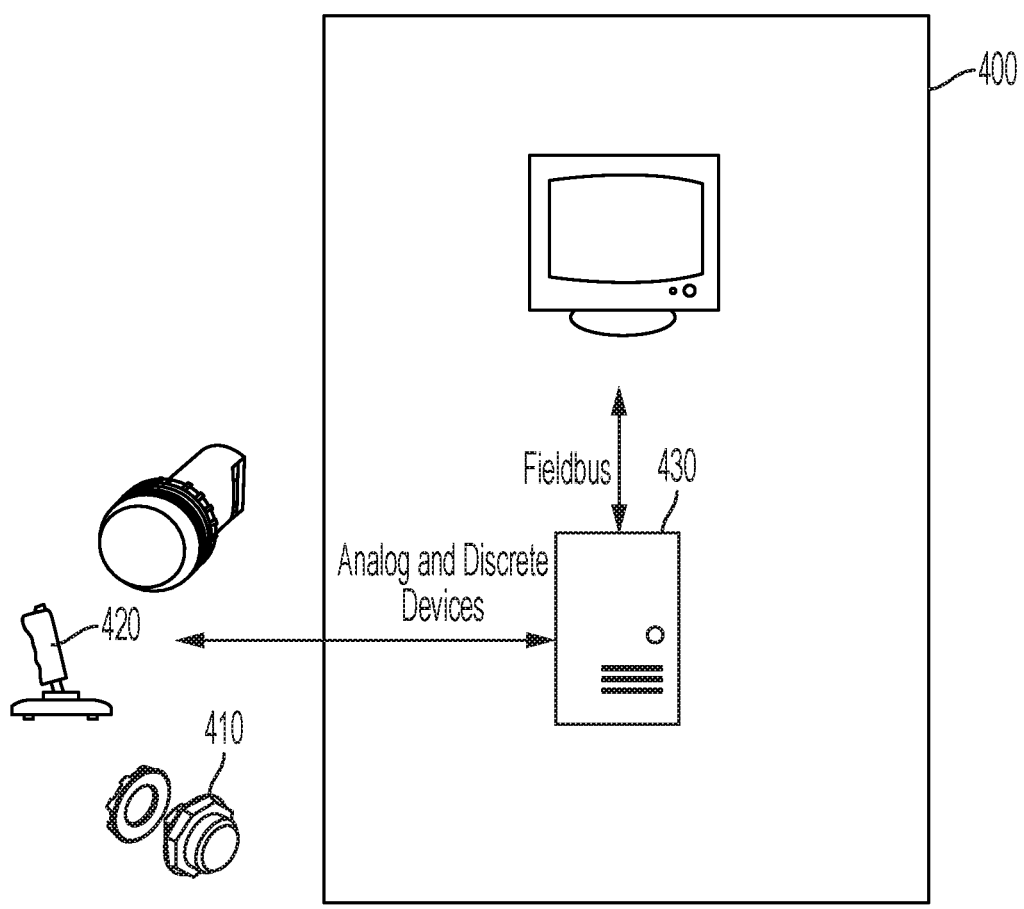
FIGS. 4 and 5 schematically illustrate other conventional control systems useable to implement the disclosed automatic gates.

This embodiment, shown in FIG. 4, is an extension of the Dedicated Controller of FIG. 1 and Shared Controller of FIG. 2 described herein above. In these embodiments, operator controls such as a push button 410 and/or a joystick 420 are only input locally at a control panel or system 400 that houses the machine control equipment 430.

Control Locations—Local Control with Remote Control Station

Figure 5:
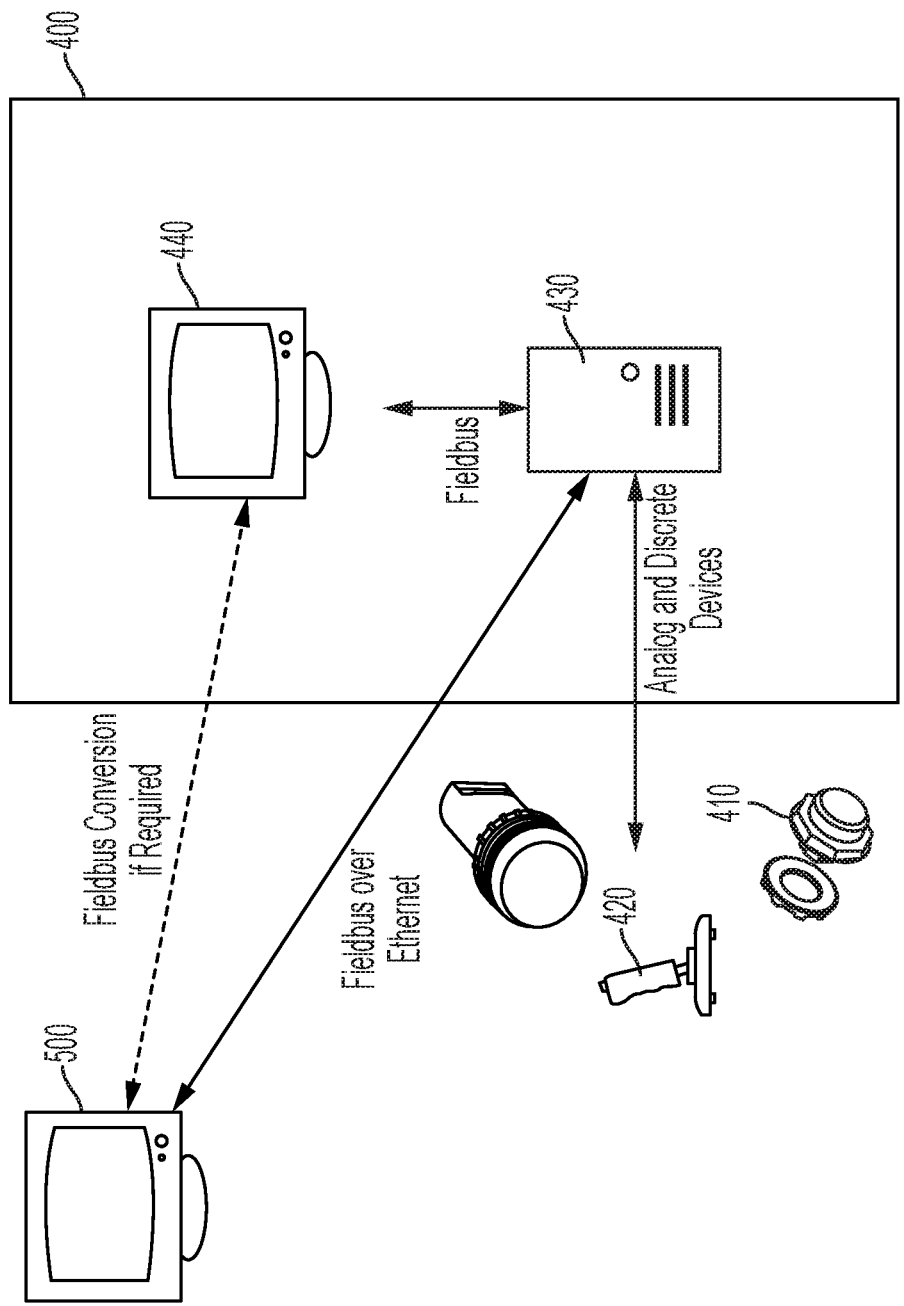

This embodiment is an extension of the Dedicated, Shared, and Dual controller arrangements described herein above with reference to FIGS. 1-3. Referring now to FIG. 5, in these embodiments, the system includes a local control station 400 having operator controls 410, 420 as described above with reference to FIG. 4, a PAC 430, and a human machine interface 440. It also includes a remote control station 500. Remote control station 500 is typically on-site, but out of sight of the local control station 400, which is usually a control room or office building.

Third Party Control

The control system used for the automatic gate can be tied into new or existing third party control systems/networks in various ways. This includes integrating sensors to generate this signal, such as radio frequency identification (RFID), phone or tablet apps, cellular signals, Wifi, GPS, infrared, or radio based signals.

Local Control with Third Party Terminals

Figure 6:
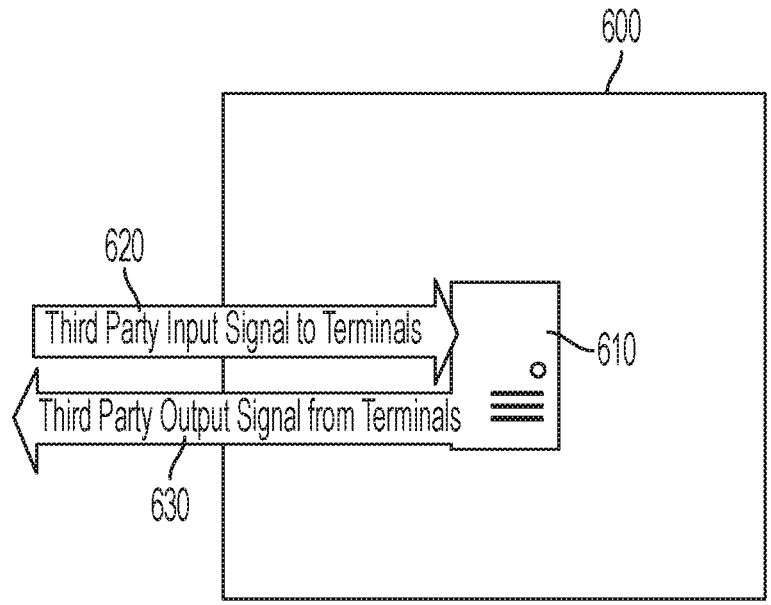
FIGS. 6-9 schematically illustrate conventional control systems that communicate with a third party control system or network to implement the disclosed automatic gates.

In this embodiment, the machine controller receives inputs and transmit outputs via discrete contact terminals located on the input/output (I/O) card(s) of the controller (for example, the Allen-Bradley® 1734-IB4 Point I/O included in their CompactLogix® line of controllers). Supplying, for example, a nominal, momentary 24 vdc voltage to input terminals will perform the assigned action. The machine will transmit, for example, a 24 vdc signal on output terminals when conditions are met. This information can be tied into an I/O card or wiring of the third party system. FIG. 6 depicts a control system 600 wherein a discrete signal 620 is sent to a machine such as a PAC 610 via a hardwired connection to provide the information needed to actuate or initiate actuation of the gate via an output signal 630.

Local Control with Third Party Field-Bus Tie-in

Figure 7:
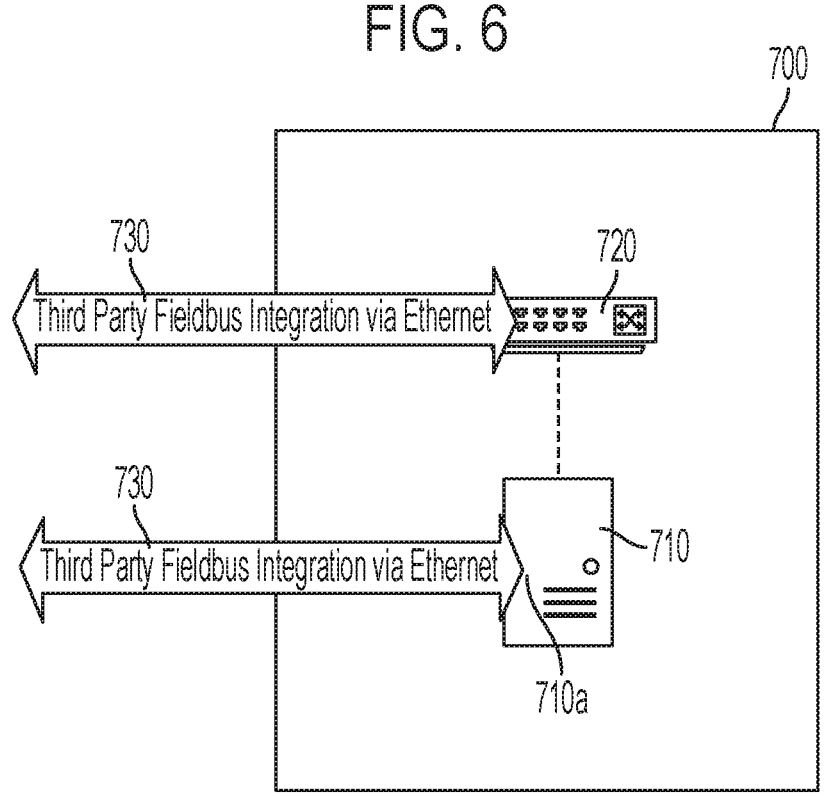

In this embodiment illustrated in FIG. 7, the machine controller 710 of a control system 700 can receive input and transmit output data via an Ethernet connection to a field-bus (for example, the ODVA® Ethernet/IP™), either directly through the controller ports 710a or via a network switch 720 on the field-bus. Signal 730 is used to actuate or initiate actuation of the gate, and is sent via a network (i.e., not via a hardwired connection). This method provides an added layer of security over the DC terminal method described above; however, it requires the third party equipment to support the machine field-bus being used.

Local Control with Third Party Field-Bus and Conversion

Figure 8:
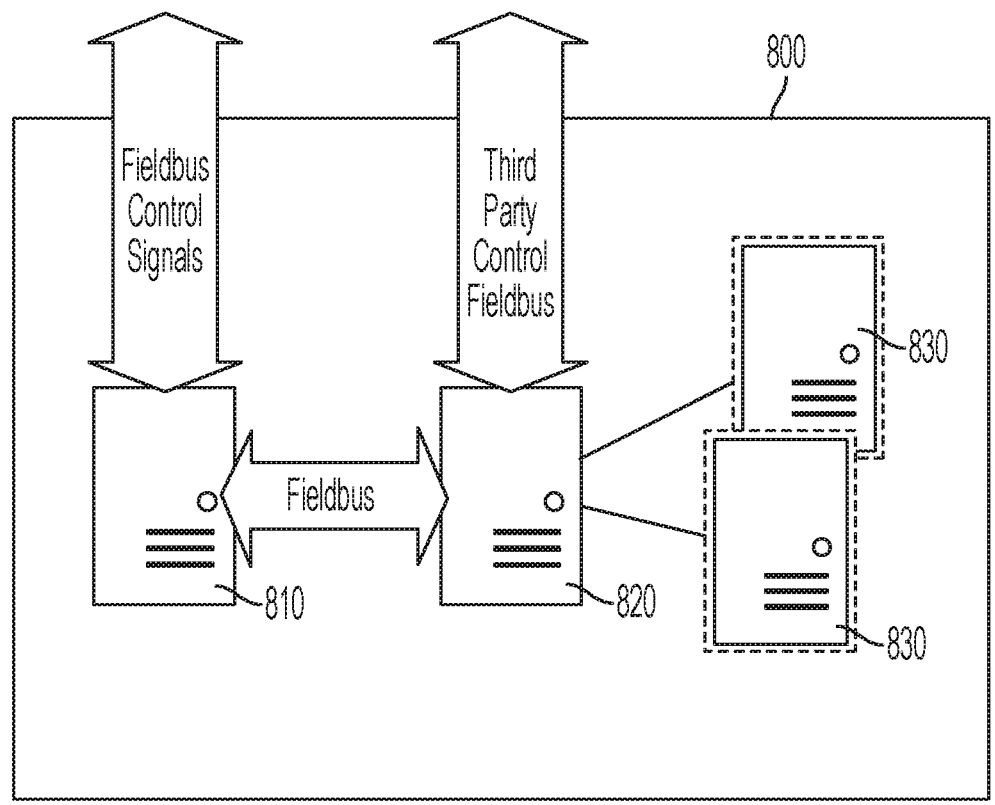

In this embodiment illustrated in FIG. 8, the machine controller 810 of a control system 800 can receive input and transmit output data via an Ethernet connection to the field-bus. This connection is made indirectly through conversion hardware 820, allowing non-matching field-bus protocols to be converted and made compatible. Red Lion DataStation Model DSPSX001 and Graphite terminals Model G07S0000 are examples of equipment 820 that have this capability. Hardware 820 can be a PC, which can also communicate with one or more PACs 830 that control systems other than the gate opening/closing system, such as a security system, etc. as desired.

Local Control with Application Programming Interface (API) Integration

Figure 9:
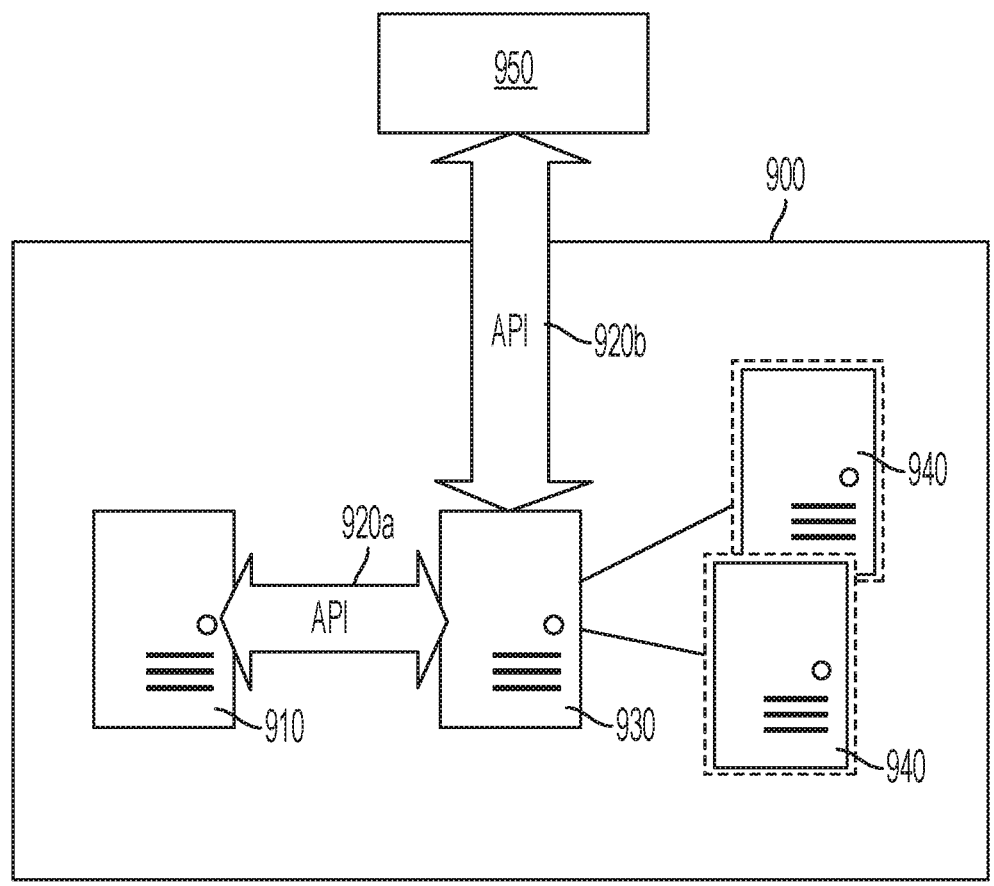

In this embodiment illustrated in FIG. 9, the machine controller 910 of a control system 900 can receive input and transmit output data via an application program interface (API) 920a, 920b with logic software running on hardware 930. This most commonly applies to PC-based PAC equipment such as Beckhoff's CX series controllers (for example, Model CX9020). Hardware 930 can also communicate with one or more PACs 940 that control systems other than the disclosed gate opening/closing system. The API 920a, 920b provides a communication method for third-party software 950 to communicate with the logic of controller 910 without requiring field-bus or discrete terminal access. Thus, third party equipment or code/software 950 can be used to communicate with the gate controller 900 to initiate gate actuation. In the exemplary embodiment of FIG. 9, third-party software 950 includes a third party security system software package tied into the controller 900 such that it can initiate the signal required to open or close the gate.

Button Based Automatic Gate Opening

Figure 10:
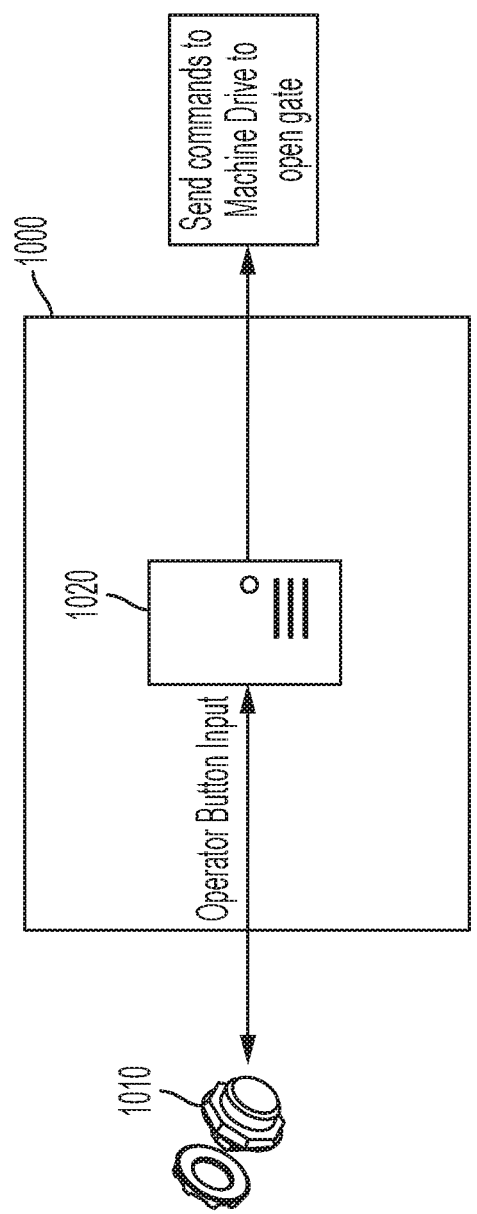
FIG. 10 schematically illustrates conventional hardware for initiating automatic gate opening and closing.

In this embodiment, machine operation commands are received locally or remotely from an operator—such as a marina manager or port operations officer. Referring now to FIG. 10, the operator selects an open, close, stop, or a partially-open command via an interface or physical button 1010 of a control system 1000. Momentarily pressing button 1010 will command the machine logic of PAC 1020 to perform the sequence of machine operations to transit the gate into the open, closed, stopped, or partially open position. This figure is shown primarily to provide a comparison the next embodiment, which includes other sensors and a single "control station."

Presence Based Automatic Gate Opening

In this embodiment, machine operation commands are received by presence detection sensors such as RFID sensors (e.g., Synometrix Synotag SM-5526B or SM-5531 sensors) also referred to as RFID "readers" or "receivers" herein, or by proximity sensors (e.g., Banner Engineering QT50ULBQ6-CRFV sensors). In certain embodiments this information passes through a credential management system to provide only authorized access control. When the presence of an authorized person or vessel is detected by a sensor, the machine controller automatically opens the gate. When the presence is no longer detected, the machine controller automatically closes the gate.

The disclosed presence detection system is mounted inside and outside the secured area, as well as on the gate's travel end platform. When a person or piece of equipment having/wearing an RFID tag or bracelet is within the detection range, an RFID reader receives the identification number from the tag. This information is compared against a credential management database. If the tag ID is authorized to open the gate, the machine controller receives the signal to open the gate, and the gate transits. If the tag is not authorized to open the gate, the tag owner is rejected and notified via an audible and/or visible signal.

In certain embodiments, when the authorized person passes out of the range of a first RFID receiver and into the range of a second receiver, indicating the authorized person is passing through the open gate, the machine is placed on standby. When the authorized person leaves the range of the second receiver, indicating they have passed through the gate, the machine controller commands the gate to close. If an RFID tag is in the range of one or more of the RFID receivers, and a proximity detection sensor, such as an ultrasonic sensor or radar (e.g., Banner Engineering QT50ULBQ6-CRFV) mounted on the moving end of the gate, detects the presence of a person or object in the closed gate path, the gate will not close unless overridden.

If there is an interruption in detection of the initiating tag, or any other tag in range, the gate closes after a set period. An alarm can also be set to turn on, and notification sent to the gate operator/security personnel, if the gate is open for an extended period of time, does not close, or if an unauthorized vessel passes through when the gate is open.

A typical exemplary embodiment of the disclosed presence based system and methodology is usable for controlling a marine gate such as shown in FIGS. 14a-16b. Such gates extend from a first attachment point to a second attachment point remote from the first attachment point when closed, and extend from the first attachment point to a point between the first and second attachment points when opened, and are for protecting a secured area.

FIGS. 11a-d illustrate a presence based automatic gate opening system 1100 according to this disclosure featuring RFID sensing, and the basic operational steps for the system 1100. A marine gate 1101 extends between a first end platform 1102 and a second end platform 1103 when closed, and opens in the direction shown in FIG. 11a. First end platform 1102 includes a control station 1104 which includes a gate control system along the lines of control systems 600, 700, 800, or 900 described herein above. A first RFID receiver or reader 1105 employed as a presence detection sensor is located outside the secured area 1108 on a first buoy, and is for communicating with a user identification unit such as an RFID tag (described in greater detail herein below).

Second end platform 1103 has a second RFID reader 1106, and a third RFID reader 1107 is located inside the secured area 1108 on a second buoy. First end platform 1102 has a fourth RFID reader 1104a. A proximity sensor 1110 is located at the free end of gate 1101 (see FIG. 11c) or alternatively attached to a flotation module or buoy. Proximity sensor 1110 can be of the conventional ultrasonic type, such as Banner Engineering's QT50u sensor, or be of a conventional radar type, such as Banner Engineering's QT50R sensor.

RFID readers 1104*a*, 1105, 1106, 1107 are conventional RFID sensors such as the Synotag Model SM-5526B or SM-5531 RFID readers available from Synometrix Integrated Technologies of Hong Kong. First and third readers 1105, 1107 are each housed in a conventional marine buoy. In certain embodiments they are powered by an umbilical, and in other embodiments are self-powered as by solar power. In embodiments shown and described herein, each reader 1105, 1107 is a single reader housed in a single buoy. However, those of skill in the art will understand that in the alternative, a plural number of reader/buoy combinations can be used for each reader.

Figure 11A:
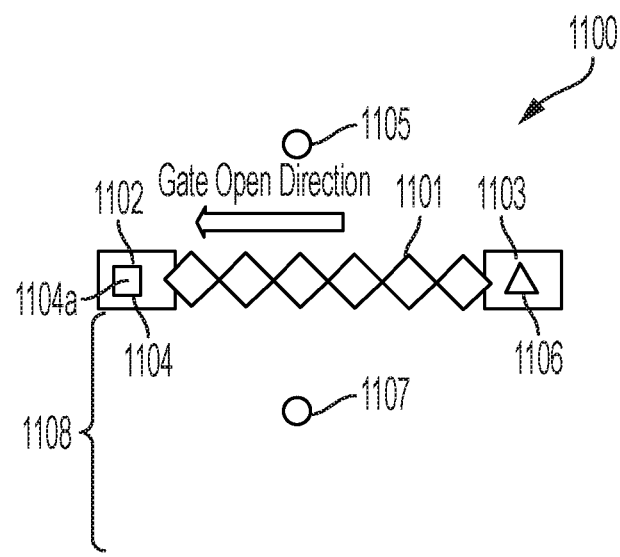
FIGS. 11a-d illustrate a presence based automatic gate operating system and methodology according to the present disclosure.
Figure 11B:
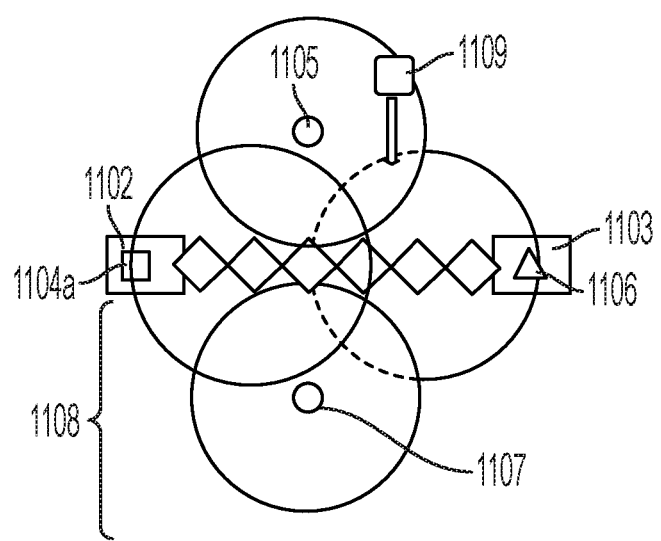

The buoy/reader combinations each have a watch-circle (i.e., range) as shown in FIG. 11*b*, and their position may not be tightly controllable due to motion of the buoy with tides, waves, wind, etc. While typical land-based RFID systems are located in a static environment (e.g., the reader is mounted at a specific location in space at fixed x, y, z coordinates), the disclosed marine-based systems must efficiently operate in a dynamic environment where its readers move in the x, y, and z directions as a function of time. For example, movement in the z direction occurs due to tides and waves, and the buoys move as a function of time due to varying wind speed and direction. Thus, the watch-circle of each of the buoy-housed readers 1105, 1107, as well as the location of an RFID tag of a vessel 1109 are all moving relative to each other in time.

To take into account the constantly changing environment and ensure users such as vessel 1109 are always tracked, each buoy-housed reader 1105, 1107 has a conventional omnidirectional antenna to detect presence in the watch-circle area shown in FIG. 11*b*. Also shown in FIG. 11*b*, the ranges of RFID readers 1104*a*, 1105, 1106, and 1107 overlap such that as the buoys and readers 1105, 1107 move, tracking of vessels is maintained. In addition to RFID readers having appropriate ranges, in certain embodiments conventional range expanding equipment is used to ensure coverage of vessels in dynamic environmental conditions. For example, range can be extended as needed by selecting an antenna with a higher gain to increase its capacity. Alternatively or additionally, range is extendible by changing the internal radio gain, changing antenna height, and/or changing operating frequencies.

Buoy-housed RFID readers 1105, 1107 are placed above the water surface at least 1 meter, within a waterproof housing to avoid signal loss due to wave events. In certain embodiments, readers are stacked above each other and/or staggered around the circumference of the buoy to enhance the signal and reception. Likewise, RFID readers 1104, 1106 mounted on the end platforms 1102, 1103 of the gate 1101 are placed on the leading edge or leading diamond of gate 1101, at least 1-1.5 meters above the water surface to avoid signal loss due to wave events. In certain embodiments, RFID readers are stacked above each other or staggered around the nose of the gate 1101 to enhance the signal/reception.

RFID readers 1104*a*, 1105, 1106, 1107 are subjected to continuous corrosive environments and temperatures. As a result, they must satisfy higher Ingress Protection (IP) ratings than land based systems. Whereas land based systems are typically rated at or below IP 65, marine systems are typically IP 67 or higher. Therefore, the readers in the disclosed systems include commercially available housings having appropriate IP ratings.

In certain embodiments, the RFID readers 1104*a*, 1105, 1106, 1107 actively mitigate the build-up of ice and/or freezing spray that occurs daily in cold weather marine environments. Land based systems are typically de-iced by hand on the low probability occurrence that ice builds up. The RFID readers of some embodiments of the disclosed system are protected from ice and freezing spray via heat tape or resistors placed within the sensor or housing to melt ice accumulation. Conventional ice mitigation technology is utilized, such as Nelson heat trace heating cable, Model NC210-CB, available from Emerson Electric Co. of Rosemont, Ill.

The disclosed systems use a conventional RFID tag located on a vessel 1109 or carried by a user of the system, such as a passive RFID tag or an active RFID tag having a transmitter for transmitting a signal to be received at one or more of the readers 1104*a*, 1105, 1106, 1107. Such tags can be handheld as a key card, or worn as a wrist or ankle band, such as the Synoband Model SM-5531 Active RFID Wristband available from Synometrix Integrated Technologies of Hong Kong. For a vessel, the tag could be located in a waterproof housing in or on the vessel's wheelhouse or pilothouse, the bow of the vessel, or any other unobstructed placement on the vessel facing the vessel's bow. An example of such a conventional tag is the Synotag Model SM-5504 Very Long Range Active RFID Tag, available from Synometrix Integrated Technologies of Hong Kong.

The disclosed marine based RFID systems have to be able to read and process signals at operating distances (i.e., the distance between RFID tag and reader) of 0-150 feet or more depending on the vessel size and classification, which can vary greatly. Land based systems are typically operated within short distances of 0-25 feet, and are limited to transiting vehicles, which can range from 0-60 feet in length, 8 feet in width (maximum per Department of Transportation guidelines), height less than 10 feet, and weight typically less than 75,000 lb. The disclosed marine systems must sense/read information from vessels as small as a jet ski (6 ft. length, 2 ft. wide, 3 ft. high and 2000 lb.) to a 500 foot long passenger vessel 100 feet wide, 30 feet off the water, having a 60,000 ton displacement. The present systems use appropriately sized and powered conventional antennas to ensure adequate operating distances. For example, operating distance (a.k.a., range) can be extended as needed by selecting an antenna with a higher gain to increase its capacity. Alternatively or additionally, range is extendible by changing the internal radio gain, changing antenna height, and/or changing operating frequencies. Some embodiments of the disclosed systems use long range active RFID tags, such as a conventional Synotag Model SM-5504 Very Long Range Active RFID Tag, available from Synometrix Integrated Technologies of Hong Kong.

Figure 11C:
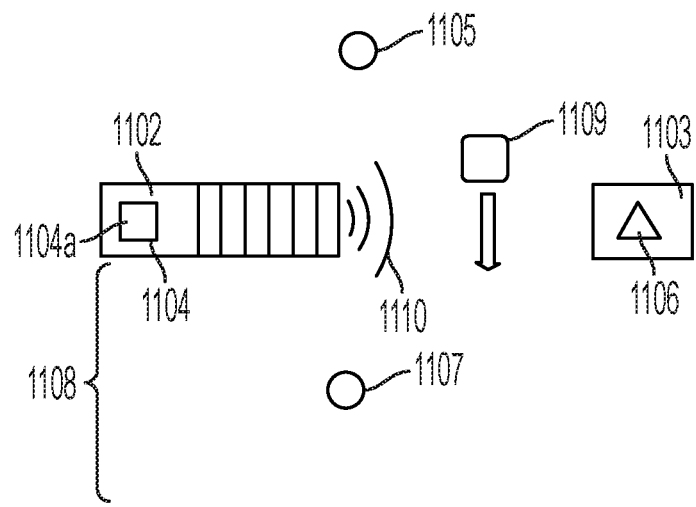
Figure 11D:
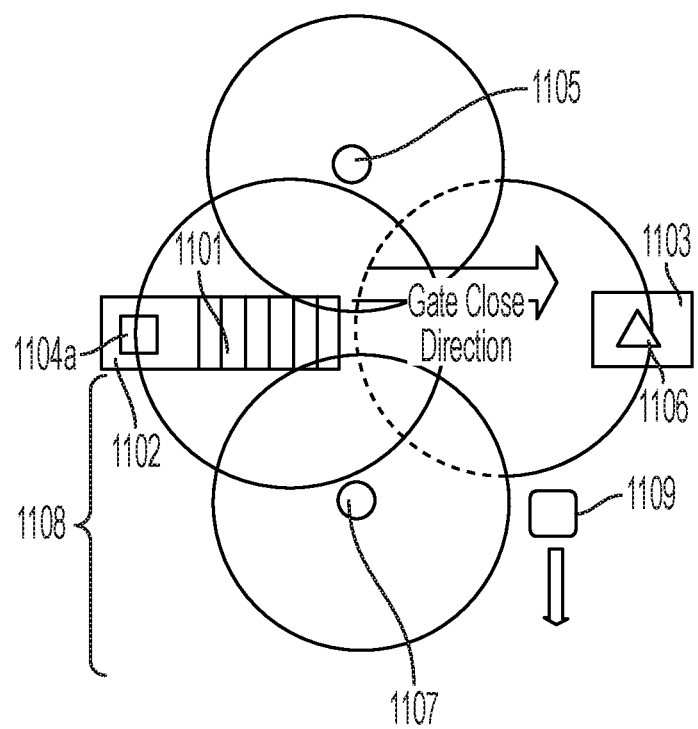

Referring now to FIG. 11*b*, when a vessel 1109 having an RFID tag with valid credentials is detected by RFID reader 1104*a*, 1105, or 1106, control station 1104 signals gate 1101 to automatically open if it is not already open. The gate 1101 remains open if it's open from a previous session. As shown in FIGS. 11*c-d*, while vessel 1109 is transiting, it is tracked by one or more of the RFID readers 1104*a*, 1106, 1107, or sensed by a proximity sensor 1110 if the RFID signal from the vessel 1109 is temporarily lost. Once the vessel's RFID signal is no longer detected, as shown in FIG. 11*d*, control station 1104 signals gate 1101 to close.

In a further embodiment, the RFID sensors 1105 and/or 1106 detect the presence of the RFID tag on the vessel 1109. If the tag is authorized, and the user presses a button (not shown) on the tag or at a predetermined location, a gate open or close command will be issued to the machine controller of control station 1104. This button can be encrypted (or its signal encrypted) as by using a further form of authorization such as a personal identification number (PIN), a biometric detection system (e.g., a fingerprint reader as on a smart phone), or can be radio frequency based (as in garage door openers). In certain embodiments, this authorization system comprises a conventional third-party system that works in conjunction with the RFID system controller; for example, as described herein above with reference to FIGS. 6-9.

Some embodiments of the disclosed system include a closed circuit television (CCTV) camera system. Such embodiments include an optical image recognition system(s) to augment the identification and/or detection of vessels attempting to transit the gate or currently transiting the gate. The RFID system controller integrates the auxiliary CCTV system for monitoring and/or control.

Figure 12:
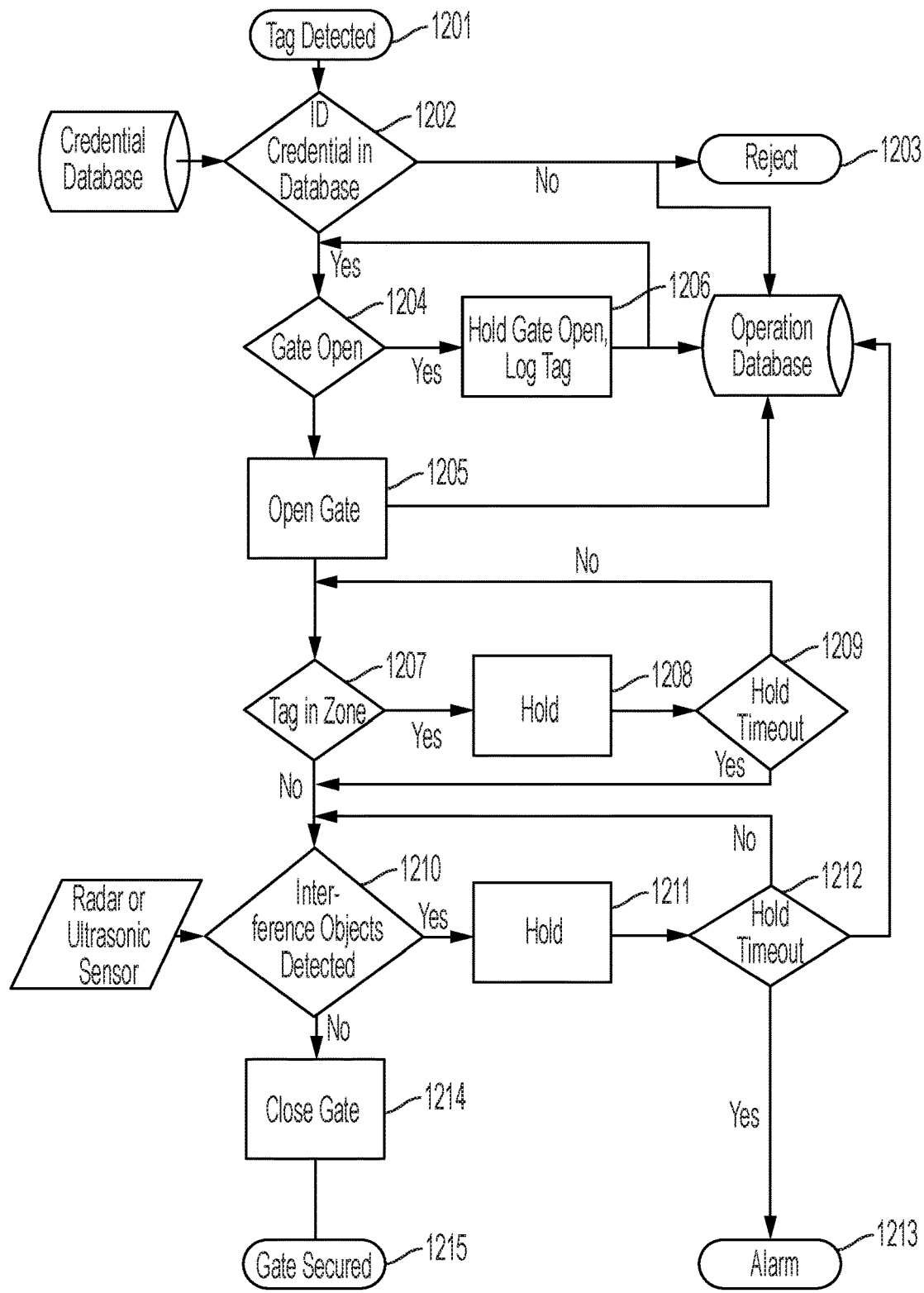
FIG. 12 is a flow chart illustrating a method of presence based automatic gate operation according to an embodiment of the present disclosure.

FIG. 12 is a flow chart illustrating the methodology of an embodiment of the disclosed RFID type sensor gate. At step 1201, an RFID tag carried by a user or on a vessel 1109 is detected by an RFID reader 1104a, 1105, 1106, 1107, and the identification number from the tag is compared against a credential database in step 1202. If the tag is not authorized to open the gate, the tag is rejected at step 1203 and the event is logged in the operation database. The tag owner can then be notified via an audible and/or visible signal. If the tag ID is authorized to open the gate, at step 1204 the machine controller 1104 receives the signal to open the gate 1101, and the gate transits (step 1205). Also, the tag ID is logged in the operation database and the gate 1101 is held open (step 1206).

At step 1207, it is determined whether the ID tag is still being detected (i.e., whether the tag is in the detection zone). If it is, the gate 1101 is held open (step 1208) and at step 1209 the elapsed time that the gate has been open is compared to a predetermined timeout for holding the gate open. If the elapsed time is less than the timeout, then steps 1207 to 1209 are repeated. If at step 1207 is it determined that the ID tag is not in the detection zone, or if at step 1209 it is determined the gate hold has timed out, the gate transit area is checked at step 1210 for interfering objects using proximity sensor 1110; for example, radar or an ultrasonic sensor.

If an interfering object is detected, the gate 1101 is held open (step 1211), and at step 1212 this event is logged in the operation database and the elapsed time that the gate has been held open since step 1211 is compared to a predetermined timeout for holding the gate open. If the elapsed time is less than the timeout, then steps 1210 to 1212 are repeated. If at step 1212 it is determined the gate hold has timed out, an alarm is sent at step 1213.

If an interfering object is not detected at step 1210, the gate 1101 is closed at step 1214 and the gate is secured at step 1215. Note that, according to steps 1207-1215, if a vessel or other user enters the system and is detected, and then turns around and/or leaves the detection area, the gate will time out and initiate a close sequence if there is no obstruction. Further note that steps 1211-1214 can be overridden by a system operator or technician.

Referring to FIG. 11b, it will be understood the steps of FIG. 12 can be performed whether a vessel or user is detected entering by reader 1105 as shown in FIG. 11b, or is travelling in the other direction and is detected entering, for example, by reader 1107.

Figure 13:
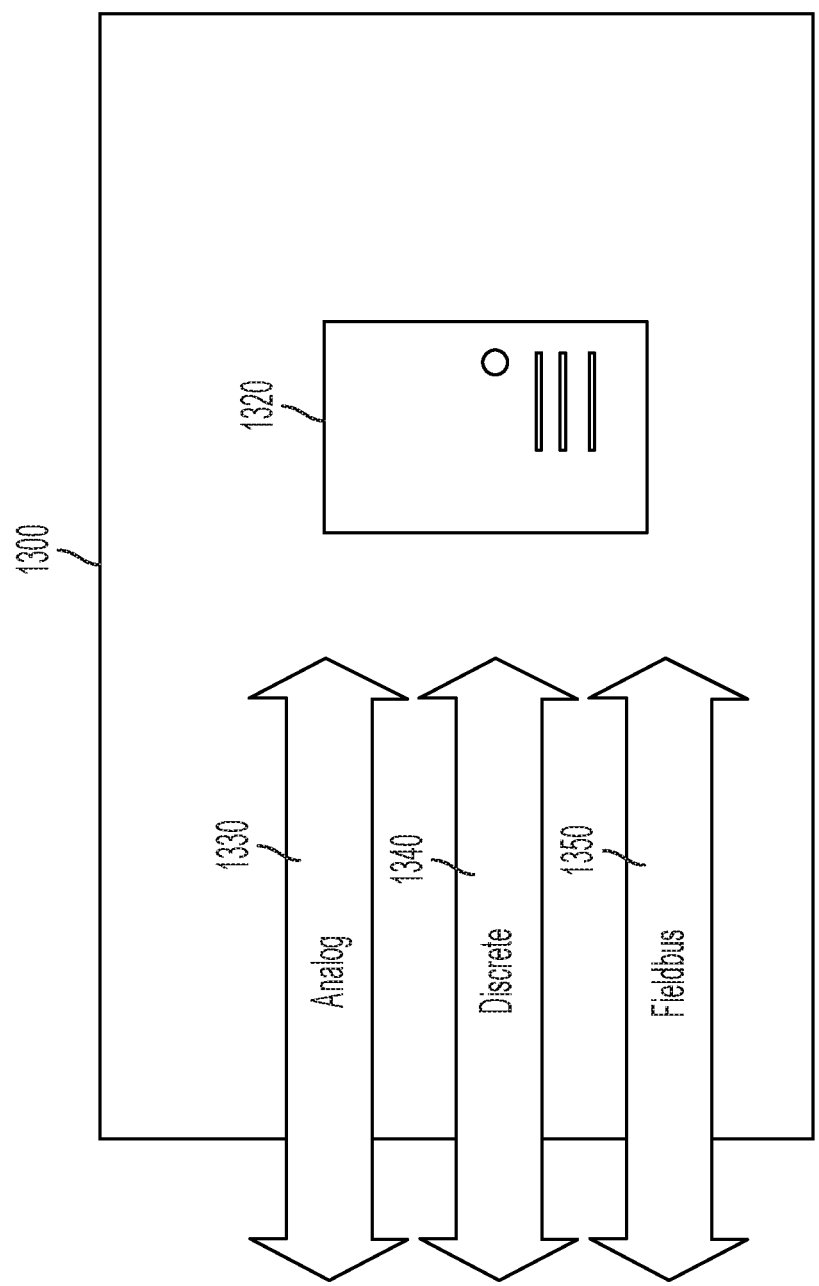
FIG. 13 schematically illustrates how the presence based gate operating system of FIGS. 11a-d can be integrated with the control systems of FIGS. 1-9.

One or more presence based sensors, such as RFID readers, can be integrated into any of the previously described control systems of FIGS. 1-10. In general, the presence based systems described herein receive a "signal" and send it to a PAC as shown in FIGS. 1-10. The PAC then processes that signal to perform predetermined tasks and steps. As illustrated in FIG. 13, an RFID reader 1310 can communicate with the PAC 1320 of a controller 1300 directly using analog signals 1330 or discrete signals 1340 as in the controller of FIG. 1, as discussed herein above. It can also communicate directly with the PAC 1320 or with a PC via a fieldbus 1350 such as an RS232, 485, Ethernet/IP, MODBUS, etc. as described herein above.

Data Usage

All operator commands are logged via data-logging hardware. This hardware can optionally log the data into a database that can be used for further maintenance, monitoring, and monetization of the gate system. Embodiments include logging cycle counts for maintenance records and interval monitoring, and/or logging the number of opening and closings associated with select individuals or groups that could be used to monetize the use of the gate. Also, operator ID use can be logged for arrival preparation; e.g., notification that an ID has arrived or left can alert staff that slip preparation and staff should be mustered. For security purposes, unauthorized or unidentified persons entering or exiting the gate are monitored.

While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

Furthermore, embodiments of the disclosed method and system for automatic gate operation for marine barriers and gate systems may be readily implemented, fully or partially, in software using, for example, object or object-oriented software development environments that provide portable source code that can be used on a variety of computer platforms. Alternatively, embodiments of the disclosed method and system can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the disclosed method and system can be implemented in hardware and/or software using any known or later developed systems or structures, devices and/or software by those of ordinary skill in the applicable art from the functional description provided herein and with a general basic knowledge of the computer, marine barrier and gate, and/or presence-based automatic gate arts.

Moreover, embodiments of the disclosed method and system for automatic gate operation for marine barriers and gate systems can be implemented in software executed on a programmed general-purpose computer, a special purpose computer, a microprocessor, or the like. Also, the method of this disclosure can be implemented as a program embedded on a personal computer such as a JAVA® or CGI script, as a resource residing on a server or graphics workstation, as a routine embedded in a dedicated processing system, or the like.

While this disclosure has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this disclosure.

What is claimed is:

1. A system for controlling a marine gate, the marine gate extending from a first attachment point to a second attachment point remote from the first attachment point when closed, and extending from the first attachment point to a point between the first and second attachment points when opened, wherein the gate is for protecting a secured area, the system comprising:
   a first RFID sensor disposed outside the secured area, for communicating with a user identification unit;
   a second RFID sensor disposed proximal the gate or one of the first and second attachment points, for communicating with the user identification unit;
   a third RFID sensor disposed inside the secured area, for communicating with the user identification unit; and
   a controller in communication with the RFID sensors, the controller having one or more processors adapted to sequentially:
      verify that the user is authorized to enter the secured area when one or more of the RFID sensors communicate with the user identification unit;
      cause the gate to open or to remain open when the user's authorization to enter the secured area is verified;
      track a location of the user identification unit using the RFID sensors while the gate is open and the user is transiting the gate; and
      cause the gate to close when the RFID sensors are no longer in communication with the user identification unit.

2. The system of claim 1, wherein the first and third RFID sensors are mounted on a buoy or a flotation device.

3. The system of claim 1, wherein the second RFID sensor is disposed on one of the first and second attachment points, and the system further comprises a fourth RFID sensor for communicating with the user identification unit, the fourth RFID sensor disposed on the other one of the first and second attachment points, and in communication with the controller.

4. The system of claim 1, wherein the one or more processors are adapted to cause the gate to close when the RFID sensors are no longer in communication with the user identification unit for a predetermined amount of time.

5. The system of claim 1, wherein the one or more processors are adapted to cause an alarm to be set or a message to be sent when the gate remains open for more than a predetermined amount of time, or if the gate does not close at the direction of the controller, or if a vessel enters the secured area without authorization.

6. The system of claim 1, wherein the one or more processors are adapted to cause the user to be notified when the one or more processors do not verify that the user is authorized to enter the secured area.

7. The system of claim 1, wherein the user identification unit comprises an RFID transmitter for transmitting a signal to be received by the RFID sensors.

8. The system of claim 1, wherein each of the RFID sensors has a range within which they communicate with the user identification unit, and the ranges of two or more of the RFID sensors overlap each other.

9. The system of claim 1, further comprising a proximity sensor at a free end of the gate remote from the first attachment point, the proximity sensor being in communication with the controller;
   wherein the one or more processors are adapted to cause the gate to remain open when the proximity sensor indicates to the controller that an interfering object is proximal the free end of the gate.

10. The system of claim 9, wherein the one or more processors are adapted to cause the gate to close when the indication of the proximity sensor is manually overridden.

11. The system of claim 1, further comprising a proximity sensor attached to a flotation device or buoy, the proximity sensor being in communication with the controller;
    wherein the one or more processors are adapted to cause the gate to remain open when the proximity sensor indicates to the controller that an interfering object is proximal the proximity sensor.

12. The system of claim 11, wherein the one or more processors are adapted to cause the gate to close when the indication of the proximity sensor is manually overridden.

13. The system of claim 1, wherein the one or more processors are adapted to verify that the user is authorized to enter the secured area by comparing a first code associated with the user identification unit with a credential management database.

14. The system of claim 13, wherein the one or more processors are further adapted to verify that the user is authorized to enter the secured area by comparing a second code transmitted by the user to the controller with the credential management database, after comparing the first code with the credential management database.

15. A method comprising:
    providing a marine gate extending from a first attachment point to a second attachment point remote from the first attachment point when closed, and extending from the first attachment point to a point between the first and second attachment points when opened, wherein the gate is for protecting a secured area;
    providing a first RFID sensor disposed outside the secured area, for communicating with a user identification unit;
    providing a second RFID sensor disposed proximal the gate or one of the first and second attachment points, for communicating with the user identification unit;
    providing a third RFID sensor disposed inside the secured area, for communicating with the user identification unit;
    verifying that the user is authorized to enter the secured area when one or more of the RFID sensors communicate with the user identification unit;
    opening the gate or causing the gate to remain open when the user's authorization to enter the secured area is verified;
    tracking a location of the user identification unit using the RFID sensors while the gate is open and the user is transiting the gate; and
    closing the gate when the RFID sensors are no longer in communication with the user identification unit.

16. The method of claim 15, comprising closing the gate when the RFID sensors are no longer in communication with the user identification unit for a predetermined amount of time.

17. The method of claim 15, comprising setting an alarm or sending a message when the gate remains open for more than a predetermined amount of time, or if the gate does not close at the direction of the controller, or if a vessel enters the secured area without authorization.

18. The method of claim 15, comprising:
    providing a proximity sensor at a free end of the gate remote from the first attachment point, or on a flotation device or buoy; and causing the gate to remain open when the proximity sensor indicates to the controller that an interfering object is proximal the free end of the gate.

19. The method of claim 18, comprising closing the gate when the indication of the proximity sensor is manually overridden.

20. The method of claim 15, wherein verifying that the user is authorized to enter the secured area comprises comparing a first code associated with the user identification unit with a credential management database.

21. The method of claim 20, wherein verifying that the user is authorized to enter the secured area comprises comparing a second code transmitted by the user to the controller with the credential management database, after comparing the first code with the credential management database.

* * * * *